(12) United States Patent
Reif et al.

(10) Patent No.: US 11,994,185 B2
(45) Date of Patent: May 28, 2024

(54) BRAKE DEVICE AND METHOD FOR CONTROLLING THE BRAKE DEVICE

(71) Applicant: STABILUS GMBH, Koblenz (DE)

(72) Inventors: Thomas Reif, Kobern-Gondorf (DE); Jörg Hillen, Nörtershausen (DE); Andreas Ritter, Hilgert (DE); Peter Oster, Bremm (DE)

(73) Assignee: STABILUS GMBH, Koblenz (DE)

( * ) Notice: Subject to any disclaimer, the term of this patent is extended or adjusted under 35 U.S.C. 154(b) by 322 days.

(21) Appl. No.: 17/608,542

(22) PCT Filed: May 5, 2020

(86) PCT No.: PCT/EP2020/062438
§ 371 (c)(1),
(2) Date: Nov. 3, 2021

(87) PCT Pub. No.: WO2020/225257
PCT Pub. Date: Nov. 12, 2020

(65) Prior Publication Data
US 2022/0228634 A1      Jul. 21, 2022

(30) Foreign Application Priority Data
May 8, 2019   (DE) .......................... 102019112005.5

(51) Int. Cl.
*F16D 63/00*          (2006.01)
*F16D 55/226*         (2006.01)
(Continued)

(52) U.S. Cl.
CPC ......... *F16D 65/186* (2013.01); *F16D 55/226* (2013.01); *A47B 9/04* (2013.01);
(Continued)

(58) Field of Classification Search
CPC ........ F16D 59/02; F16D 65/186; F16D 67/02; F16D 2121/16; F16D 2121/26;
(Continued)

(56) References Cited

U.S. PATENT DOCUMENTS 3,732,447 A * 5/1973 Perhats .................... H02K 7/10
                                                       310/76
4,466,511 A * 8/1984 Garnett .................. B23Q 11/04
                                                       188/134

(Continued)

FOREIGN PATENT DOCUMENTS

WO        9961814 A1    12/1999
WO     2017010496 A1     1/2017

OTHER PUBLICATIONS

International Search Report for PCT /EP2020/062438 dated Jul. 21, 2020.

*Primary Examiner* — Nicholas J Lane
(74) *Attorney, Agent, or Firm* — Schmeiser, Olsen & Wats, LLP

(57) ABSTRACT

Provided is a brake device for braking a rotational movement of a shaft about the longitudinal axis, wherein the shaft is mounted so as to be rotatable about the longitudinal axis in a direction of rotation and in a counter direction which opposes the direction of rotation. Brake devices typically use constant and relatively high braking torques, to ensure a controlled movement of a movement portion, braked by the brake device, in every situation. However, this increases the energy consumption for a movement of the movement portion, and the wear of the brake device. A brake device equipped with a setting device for mutually opposing setting of a braking torque on the shaft during rotation of the shaft in the direction of rotation, and a counter braking torque during rotation of the shaft in the counter direction is (Continued)

provided. Also provided is a method for controlling a brake device.

12 Claims, 3 Drawing Sheets

(51) Int. Cl.
*F16D 65/18* (2006.01)
*A47B 9/04* (2006.01)
*E05F 15/622* (2015.01)
*F16D 121/24* (2012.01)
*F16D 125/48* (2012.01)

(52) U.S. Cl.
CPC ......... *E05F 15/622* (2015.01); *E05Y 2201/21* (2013.01); *E05Y 2900/546* (2013.01); *F16D 2121/24* (2013.01); *F16D 2125/48* (2013.01)

(58) Field of Classification Search
CPC ........... F16D 2125/48; F16D 2127/004; E05Y 2201/21; H02K 7/112
See application file for complete search history.

(56) References Cited

U.S. PATENT DOCUMENTS

| | | | | |
|---|---|---|---|---|
| 4,697,672 | A | * | 10/1987 | Linton .................... F16D 67/00 188/134 |
| 5,577,581 | A | * | 11/1996 | Eberwein ................ F16D 67/04 192/113.21 |
| 6,109,415 | A | * | 8/2000 | Morgan .................. B64C 13/28 192/223.1 |
| 2002/0046817 | A1 | * | 4/2002 | Last ........................ E04H 4/101 160/133 |
| 2004/0055837 | A1 | * | 3/2004 | Severinsson ............ F16D 28/00 188/166 |
| 2010/0192328 | A1 | * | 8/2010 | Scheck ................... E05D 11/02 16/342 |
| 2017/0146085 | A1 | * | 5/2017 | Defosse ................. F16D 41/02 |
| 2018/0128026 | A1 | | 5/2018 | Burgess |
| 2019/0242171 | A1 | * | 8/2019 | Wittelsbuerger ....... F16D 59/02 |

* cited by examiner

BRAKE DEVICE AND METHOD FOR CONTROLLING THE BRAKE DEVICE

CROSS-REFERENCE TO RELATED APPLICATIONS

This application claims priority to PCT Application No. PCT/EP2020/062438, having a filing date of May 5, 2020, based on German Application No. 10 2019 112 005.5, having a filing date of May 8, 2019, the entire contents both of which are hereby incorporated by reference.

FIELD OF TECHNOLOGY

The following relates to a brake device for braking a rotational movement of a shaft about the longitudinal axis thereof, wherein the shaft is mounted so as to be rotatable about the longitudinal axis in a direction of rotation and in a counter direction of rotation which opposes the direction of rotation. The following also relates to a method for setting the braking torque and/or counter braking torque brought about by the brake device.

BACKGROUND

Drive systems, in particular for electromechanically opening and closing for example vehicle doors, tailgates or engine covers are known from the conventional art. In this case, the drive system can assist in the case of manual opening, holding open and closing of the door, and/or can independently open and close the door. In a linear drive, for example, the force of an electric motor is transferred to the door via a threaded spindle. Furthermore, drive systems of this kind are also used in adjustable furniture, such as height-adjustable tables.

Drive systems of this kind generally comprise a brake device. In this case, the brake device has a plurality of functions. On the one hand, it makes it possible, for example, to hold a very heavy tailgate of a vehicle in an (in any desired) angular position, and on the other hand it allows for a more uniform movement of the drive system. Furthermore, damage, for example to a tailgate in the case of closure using acceleration forces that are too high (resulting, for example, from a hand force of a user, and the gravity acting on the tailgate), can be prevented by the opposing braking force and/or the resulting braking torque.

In vehicles, side swing doors, side sliding doors, and tailgates, in particular depending on the vehicle position with respect to a gradient/incline and/or slope, require a different braking torque in the opening and closing direction thereof, in order to retain the relevant load, or to comfortably perform a movement, in each movement direction, with the lowest possible manual and/or electrical drive torques. These braking torques which differ depending on the vehicle position are due to gravity, which generates an additional closure torque (or opening torque) from the weight force of the door or hatch, depending on the incline and the position of the centre of gravity of the door or hatch with respect to the associated hinge axis, in space.

In principle, however, in the conventional art a braking force must be selected that is sufficiently large that the relevant load can be retained in the desired position, even counter to the greatest closure force (on account of gravity) that is possible in all relevant vehicle positions.

Similar applies in the case of a loaded height-adjustable table, in order that no uncontrolled downward movement of the tabletop occurs, even in the case of the highest expected loading of the table.

This is disadvantageous, in each case, in that routinely too high a braking torque acts in the opposing movement direction (e.g., open tailgate or raised table) and in unproblematic vehicle positions (or at a low table load), which makes a movement difficult and thus renders manual operation force-intensive and uncomfortable, and/or on average significantly increases the energy consumption of the drive system for a motorised movement. Furthermore, a high braking torque increases the wear of the brake device and of the drive system, and thus significantly reduces the service life of the brake device and of the drive system.

SUMMARY

An aspect relates to a cost-effective and durable brake device of the type mentioned at the outset, and a method for controlling the brake device, which allow for safe, reliable and efficient operation, in particular of a drive system comprising the brake device.

The brake device according to embodiments of the invention is designed for braking a rotational movement of a shaft about the longitudinal axis thereof, wherein the shaft is mounted so as to be rotatable about the longitudinal axis in a direction of rotation and in a counter direction of rotation which opposes the direction of rotation. The shaft can for example be mechanically connected to a drive shaft, in particular a drive spindle, of a drive system. The drive system is for example a linear drive, wherein the movement axis in particular extends along a drive spindle of the linear drive, which in the simplest case can be in parallel with, in particular identical to, the longitudinal axis of the shaft.

In an embodiment, the brake device comprises at least one brake disc which is connected to the shaft by a free wheel and which is designed to cooperate with a thrust washer in order to generate a braking torque on the shaft, wherein the free wheel couples the brake disc to the shaft in the event of a rotation of the shaft in the direction of rotation, and decouples it from the shaft in the event of a rotation of the shaft in the counter direction of rotation.

The brake disc and the thrust washer can cooperate mechanically, in particular by rubbing against one another, in order to generate the braking torque. The brake disc and the thrust washer can cooperate magnetically, in particular as a hysteresis brake, in order to generate the braking torque. The designation "brake disc" or "thrust washer" is used, according to embodiments of the invention, for elements of any shape which cooperate in order to generate the braking torque. In an embodiment that is particularly simple to produce, the elements are disc-shaped or annular.

In an embodiment, the brake device comprises at least one counter brake disc which is connected to the shaft by a counter free wheel and which is designed to cooperate with a counter thrust washer in order to generate a counter braking torque on the shaft, wherein the counter free wheel couples the counter brake disc to the shaft in the event of a rotation of the shaft in the counter direction of rotation, and decouples it from the shaft in the event of a rotation of the shaft in the direction of rotation.

In an embodiment, the brake device comprises at least one setting device for setting the braking torque and the counter braking torque in a mutually opposing manner.

The brake device is thus configured to provide a braking torque and a counter braking torque counter to the rotational movements of the shaft, in both directions around the longitudinal axis, wherein the magnitudes of the braking torque and counter braking torque can be set. By way of this solution, the braking torque and counter braking torque can in particular be set so as to be different from one another, for example such that a movement of a tailgate or tabletop in the direction of gravity is braked more strongly than a movement counter to gravity. As a result, the energy consumption of the drive system for the tailgate or tabletop is reduced, and the service life of the drive system and of the brake device is increased.

The braking torque and the counter braking torque can in particular be set during operation of the brake device, i.e., allow for adjustment to the respective situation (for example a vehicle position in the gravitational field, or the table load on a height-adjustable tabletop).

In order to balance load changes on a movement portion braked by the brake device, for example a tailgate or an adjustable tabletop, it is generally advantageous to set the braking torque and the counter braking torque in a mutually opposing manner, in order that on the one hand the movement portion is not accelerated in an uncontrolled manner in the direction of the load change, and on the other hand as smooth-running as possible a manual or automatic movement counter to the load change is possible.

A "mutually opposing setting" means that, in a single adjustment process, for example preferably but not necessarily simultaneously, the braking torque can be increased and the counter braking torque reduced, or can be set conversely.

For example, the setting device can comprise a common control unit for opposing setting of the braking torque and of the counter braking torque, for example by an, in particular motorized, opposing setting of a spacing or a contact pressure between the thrust washer and brake disc on the one hand, and the counter thrust washer and counter brake disc on the other hand.

In an embodiment, the setting device comprises a connection device, wherein the connection device mechanically, in particular rigidly or resiliently, connects the thrust washer to the counter thrust washer, and is arranged so as to be displaceable along a connection axis, between the brake disc and the counter brake disc, over a displacement path. The connection device makes it possible for the thrust washer and the counter thrust washer to be displaced together, along the connection axis, in order to particularly easily simultaneously set on the one hand a spacing or a contact pressure between the thrust washer and brake disc, as well as, on the other hand, the counter thrust washer and counter brake disc, in a mutually opposing manner. The connection device therefore allows for particularly simple mutually opposing setting of the braking torque and of the counter braking torque.

The connection device can for example be displaceable within a displacement path, along the shaft. Depending on the embodiment, there may be a portion of the displacement path in which the braking torque and counter braking torque can be set simultaneously, by the displacement of the connection device.

In an embodiment, the connection device is arranged between the thrust washer and the counter thrust washer, wherein a spring for pressing the thrust washer against the brake disc is arranged between the connection device and the thrust washer, and/or a counter spring for pressing the counter thrust washer against the counter brake disc is arranged between the connection device and the counter thrust washer. If the connection device is displaced along the connection axis, a tension of the spring and/or of the counter spring can be set in a mutually opposing manner as a result. In particular, it is possible for the tension of the spring to be increased and the tension of the counter spring to be reduced, simultaneously, or vice versa. The tension of the spring and/or counter spring can set a contact pressure of the thrust washer on the brake disc, and/or of the counter thrust washer on the counter brake disc. Overall, it is thus possible for the braking torque and the counter braking torque to be easily set, in a mutually opposing manner, by a displacement of the connection device.

The spring and/or the counter spring may be a helical spring that is in particular arranged around the shaft, for example arranged coaxially around the shaft.

In an embodiment, the thrust washer, the counter thrust washer, the brake disc and the counter brake disc are arranged annularly around the longitudinal axis, and, in an embodiment, the connection device is arranged in a sleeve-like manner around the longitudinal axis and is mounted so as to be displaceable along the longitudinal axis, wherein the thrust washer and the counter thrust washer are arranged between the brake disc and the counter brake disc, and the connection device is arranged between the thrust washer and the counter thrust washer. As a result of an in particular concentric arrangement of the cited components about the longitudinal axis, a particularly space-saving design of the brake device is achieved, and it is possible to bring about a braking torque and counter braking torque that is independent of the rotational angle of the shaft about the longitudinal axis, as a result of which the shaft and brake device are uniformly loaded, and the wear is reduced.

In an embodiment, the brake device comprises an, in particular electrical, braking torque adjustment drive for displacing the connection device along the connection axis, as a result of which the magnitude of the braking torque and counter braking torque can be set in a motorised manner. The braking torque adjustment drive in particular allows for an (automatic) adjustment of the braking torque and counter braking torque during operation of the brake device, for example in response to sensor data (load sensor, position sensor, etc.). The braking torque adjustment drive can comprise a rotational drive having an adjustment shaft, the axis of rotation of which extends for example in parallel with the longitudinal axis of the shaft.

The braking torque adjustment drive can be mechanically connected to the connection device via a gear mechanism, for example by a spur gear or a plurality of spur gears, and can displace these along the connection axis between the brake discs. In an embodiment, the gear is designed so as to be self-locking, for example by a self-locking pitched thread for displacing the connection device, in order that the connection device is not displaced in an uncontrolled manner during operation of the brake device, which would cause the braking torque and the counter braking torque to change in an uncontrolled manner.

In embodiments, it is preferable if, in the case of the displacement of the connection device in a region of the displacement path:

only setting either of the braking torque or of the counter braking torque is brought about, while the respective other torque remains constant, and/or the braking torque is increased and the counter braking torque is simultaneously reduced, or vice versa, and/or neither the braking torque nor the counter braking torque.

It is possible for one of the three cited situations, in each case, to arise in different regions of the displacement path, it not being necessary for every situation to be implemented in every embodiment. It is possible, for example, for both torques to be set simultaneously over the entire displacement path. It is also possible for in each case just one of the two torques to be able to be set in each region of the displacement path, wherein the displacement path can in each case comprise at least one region in which the braking torque can be set, and one counter region, for example adjoining the region, in which the counter braking torque can be set. It is likewise possible for there to be a (for example a central) region of the displacement path in which neither of the torques changes in the event of a displacement of the connection device.

In an embodiment, the brake device comprises a stop for the thrust washer, wherein the stop brings about cooperation of the thrust washer with the brake disc for generating a minimum braking torque independently of a setting of the setting device, and/or a counter stop for the counter thrust washer, wherein the counter stop brings about cooperation of the counter thrust washer with the counter brake disc for generating a minimum counter braking torque independently of a setting of the setting device.

The stop prevents, for example, a spacing between the thrust washer and the brake disc from increasing too significantly, or a contact pressure of the thrust washer against the brake disc from reducing too significantly, in order to bring about the minimum braking torque if the connection device moves away from the brake disc. In particular, the stop can prevent a spring support of a spring arranged between the connection device and the thrust washer from moving too far from the thrust washer, in order to bring about a contact pressure of the thrust washer on the brake disc which is sufficient for the tension of the spring. The counter stop can be designed and act in a manner analogous to the stop.

Depending on the application, it may be desirable to provide a minimum braking torque and/or counter braking torque, independently of the setting device, for example in order to set a maximum acceleration of a movement portion braked by the brake device, for example of a tailgate or a table top, in order to minimise the risk of personal injury or material damage due to too high an acceleration and high impact energy of the movement portion resulting therefrom. The stop and/or counter stop provides the minimum braking torque and/or counter braking torque, in particular also in the case of incorrect operation or a malfunction of the setting device.

In an embodiment, the brake device comprises a control unit for automatic setting of the braking torque and/or of the counter braking torque, and a number of sensors which are connected, communicatively, to the control unit, for determining a load torque acting on the shaft in the direction of rotation or counter direction of rotation. The load torque can result for example from a weight force of a movement portion braked by the brake device, for example a tailgate or a tabletop.

Alternatively, or in addition to the control unit and the sensors, the brake device can comprise a number of interfaces for communicative connection, to an external control unit and/or a number of external sensors.

Using the sensor, the control unit can adjust the braking torque and/or counter braking torque, during operation of the brake device, in a manner appropriate to the situation; for example, the braking torque and/or counter braking torque can be set such that it exactly balances the load torque or is higher than the load torque by a safety margin. As a result, an uncontrolled movement of a movement portion braked by the brake device, for example on account of gravity, is reliably prevented, while a desired movement is still possible, at a low energy input.

The sensors can comprise at least one load sensor for determining a load applied on a movement portion braked by the brake device. In the case of the known geometry of the movement portion, the control unit can calculate the load torque acting on the shaft from the load, and can set the braking torque and/or counter braking torque accordingly, in particular in order to balance the load torque. This is advantageous in particular for use in tables comprising height-adjustable tabletops, in order to determine and set an optimal braking torque and/or counter braking torque for the respective load acting on the tabletop and for the respective movement direction.

The sensors can comprise at least one position sensor for determining a spatial position of a movement portion braked by the brake device, in a gravitational field. In the case of known dimensions and known mass distribution of the movement portion, the control unit can calculate the load torque acting on the shaft on account of the gravitational force from the position, and can set the braking torque and/or counter braking torque accordingly, in particular in order to balance the load torque. This is advantageous in particular for use in vehicles, in order to determine and set an optimal braking torque and/or counter braking torque for the respective position of the movement portion, for example a tailgate of the vehicle, e.g., if the vehicle is parked on a slope or at the edge of a cambered roadway.

A drive system according to embodiments of the invention for driving a rotational movement of a shaft, about the longitudinal axis thereof, in a direction of rotation and/or in a counter direction of rotation opposite the direction of rotation, comprises at least one brake device according to embodiments of the invention for braking a rotational movement of the shaft in the direction of rotation and in the counter direction of rotation.

Embodiments of the invention are also achieved by a device, in particular a vehicle or item of furniture, comprising a reference portion and a movement portion. The device comprises at least one drive system according to embodiments of the invention, according to any of the preceding claims, for driving a movement of the movement portion relative to the reference portion.

If the device is a vehicle, the reference portion may for example comprise a body of the vehicle, and/or the movement portion may comprise a door, engine cover, tailgate, or luggage compartment hatch of the vehicle.

The item of furniture may for example be a table or a chair, wherein the reference portion may comprise at least a foot of the item of furniture, and the movement portion may be a height-adjustable tabletop or seat surface of the item of furniture. A table according to embodiments of the invention, comprising a height-adjustable tabletop, makes it possible, for example, to set a braking torque counter to lowering of the tabletop, which is higher than a counter braking torque counter to raising of the tabletop. As a result, the energy consumption for raising the tabletop is reduced, and the service life of the brake device and of the drive system is increased.

An embodiment of the device as an item of furniture, which embodiment is an alternative to embodiments of the invention, comprises a drive system, which is an alternative to embodiments of the invention, for driving a movement of the movement portion of the item of furniture relative to the reference portion of the item of furniture. The alternative drive system for driving a rotational movement of a shaft, about the longitudinal axis thereof, in a direction of rotation and/or in a counter direction of rotation opposite the direction of rotation, comprises at least one brake device which is alternative to embodiments of the invention for braking a rotational movement of the shaft at least in the direction of rotation.

The alternative brake device comprises at least one brake disc which is connected to the shaft by a free wheel and which is designed to cooperate with a thrust washer in order to generate a braking torque on the shaft, wherein the free wheel couples the brake disc to the shaft in the event of a rotation of the shaft in the direction of rotation, and decouples it from the shaft in the event of a rotation of the shaft in the counter direction of rotation, and at least one setting device for setting the braking torque.

In an embodiment, the alternative brake device does not generate any counter braking torque for braking a rotational movement of the shaft in the counter direction of rotation. In this case "no/not any counter braking torque" is not to be understood as exactly zero, since the free wheel can also generate a small, but non-vanishing, counter braking torque.

When the item of furniture is used as intended, loads caused by gravity, which act on the movement portion of an item of furniture, for example on a height-adjustable tabletop or a height-adjustable seat surface, generally bring about load torques on the shaft of the drive system in exactly one direction. In order to balance the load torques, it is therefore sufficient for the alternative brake device to generate a braking torque but no counter braking torque. As a result, the alternative brake device can be constructed in a particularly simple manner, in particular without a counter free wheel, counter brake disc and counter thrust washer. Nonetheless, the braking torque can be adjusted in a manner appropriate to the situation, during operation of the alternative brake device.

For example, the braking torque can be set such that it exactly balances the load torque or is higher than the load torque by a safety margin. As a result, an uncontrolled movement of a movement portion, for example on account of the weight force of a mass deposited on a tabletop, can be reliably prevented, while a desired movement is still possible, at a low energy input.

Furthermore, the alternative brake device can be designed in a manner analogous to the brake device according to embodiments of the invention, resulting in the advantages described in this respect.

In an embodiment, the device comprises a control unit for setting the braking torque brought about by the brake device of the drive system, and a number of sensors which are connected, communicatively, to the control unit, for determining a load torque acting on the shaft in the direction of rotation or counter direction of rotation of the shaft of the drive system. The control unit and/or the sensors can be integrated into the brake device and/or connected, communicatively, to the brake device by a number of corresponding interfaces.

The control unit and the sensors result in the advantages and possible embodiments already described with respect to the control unit and the sensors of the brake device. In an embodiment, the sensors comprise at least one position sensor for determining a position of the movement portion in a gravitational field.

A method according to embodiments of the invention for setting the braking torque and/or counter braking torque, brought about by the brake device of the drive system of a device according to embodiments of the invention, by the control unit of the device, for example comprises determining, by the sensors of the device, a load torque acting on the shaft in the direction of rotation or counter direction of rotation of the shaft of the drive system.

In an embodiment, the method comprises setting the braking torque and/or counter braking torque brought about by the brake device, in particular following the determination, such that the load torque is balanced by braking torque or counter braking torque of the brake device that counteracts the load torque, wherein the braking torque and the counter braking torque are set in a mutually opposing manner in an embodiment.

The setting adjusts the braking torque and/or counter braking torque, during operation of the brake device, in a manner appropriate to the situation; for example, the braking torque and/or counter braking torque can be set such that it exactly balances the load torque or is higher than the load torque by a safety margin. As a result, an uncontrolled movement of the movement portion braked by the brake device can be reliably prevented, while a desired movement is still possible, at a low energy input.

In one embodiment, the device comprises a table having a height-adjustable tabletop and at least one load sensor for determining a load acting on the tabletop, wherein the table comprises a control unit which reduces the braking torque counter to a downward movement of the tabletop as the load decreases, and raises the braking torque counter to counter to an upward movement of the tabletop as the load increases. This solution makes it possible to achieve controlled lowering of the tabletop in a manner having a sufficiently high (but not too high) braking torque, and simultaneously raising of the tabletop against a counter braking torque that is selected so as to be low. As a result, the energy consumption and the brake wear are reduced. At the same time, the performance of the drive system for adjusting the tabletop can be selected to as to be lower than in the conventional art, since it is not necessary to overcome any large counter braking torque when the tabletop is raised.

BRIEF DESCRIPTION

Some of the embodiments will be described in detail, with references to the following Figures, wherein like designations denote like members, wherein.

DETAILED DESCRIPTION

Figure 1:
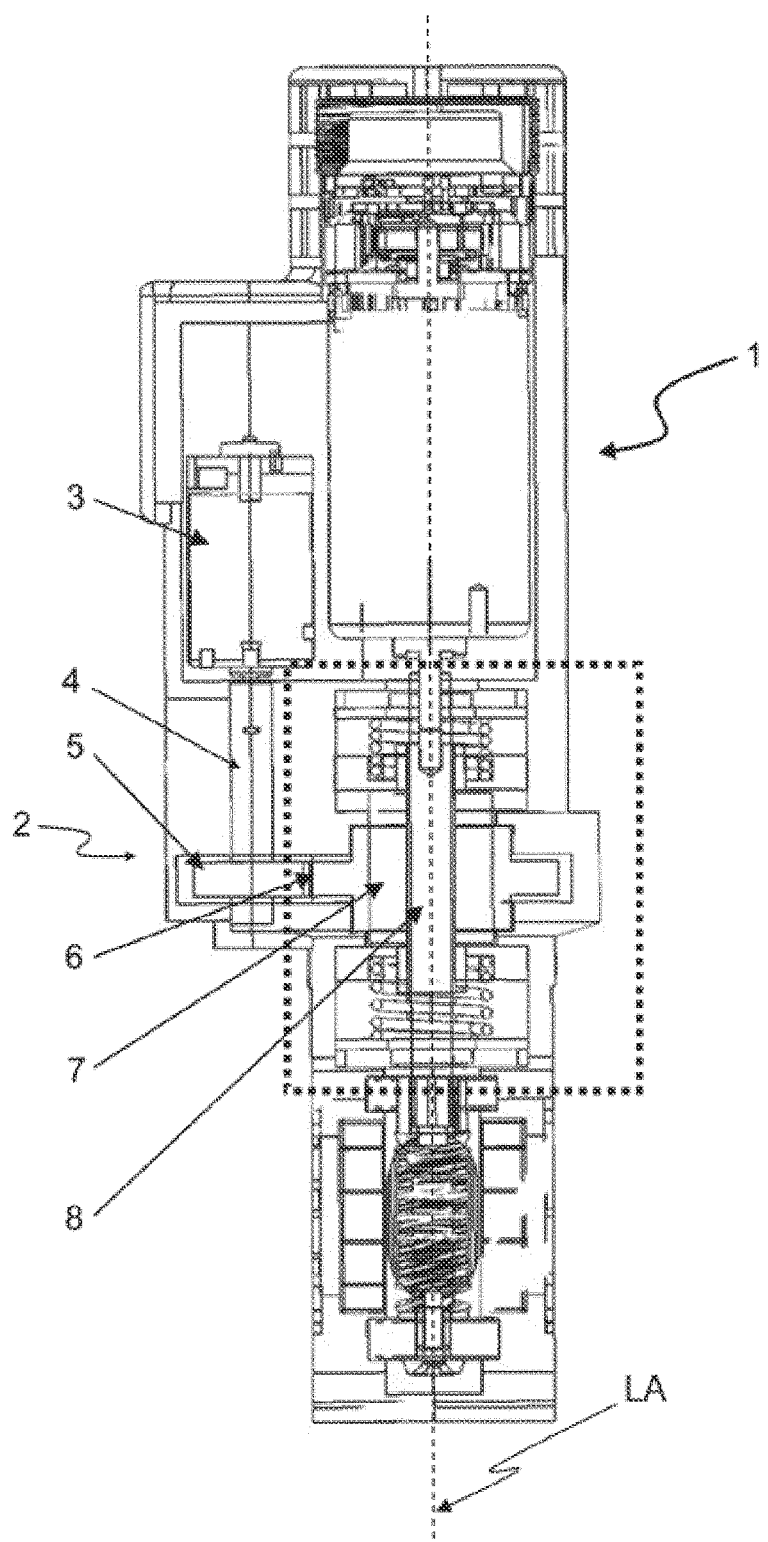
FIG. 1 is a longitudinal section through a drive system according to an embodiment.

FIG. 1 is a longitudinal section through a drive system 1 according to embodiments of the invention comprising a brake device 2. The drive system 1 is designed for driving a rotational movement of a shaft 8, about the longitudinal axis LA thereof, in a direction of rotation and/or in a counter direction of rotation opposite the direction of rotation. The drive system 1 shown comprises a brake device 2 according to embodiments of the invention for braking a rotational movement of the shaft 8 in the direction of rotation and in the counter direction of rotation.

The brake device 2 comprises a braking torque adjustment drive 3, for example. The braking torque adjustment drive 3 drives a displacement of a connection device 7 along the longitudinal axis LA by a self-locking gear, for example, in order to set the braking torque and/or the counter braking torque of the brake device 2. The self-locking gear comprises, for example, a drive spur gear 5 and a main spur gear 6.

In particular, the braking torque adjustment drive 3 can be designed for driving a drive spur gear 5 by an adjustment shaft 4, via which gear a main spur gear 6 is driven. The main spur gear 6 can in turn be designed to rotate a self-locking pitched thread in the interior thereof, in order to displace the connection device 7 along the longitudinal axis LA via a mating thread on the, for example sleeve-like, connection device 7. This is explained in detail in FIG. 2, with reference to the region inside the dashed box.

Figure 2:
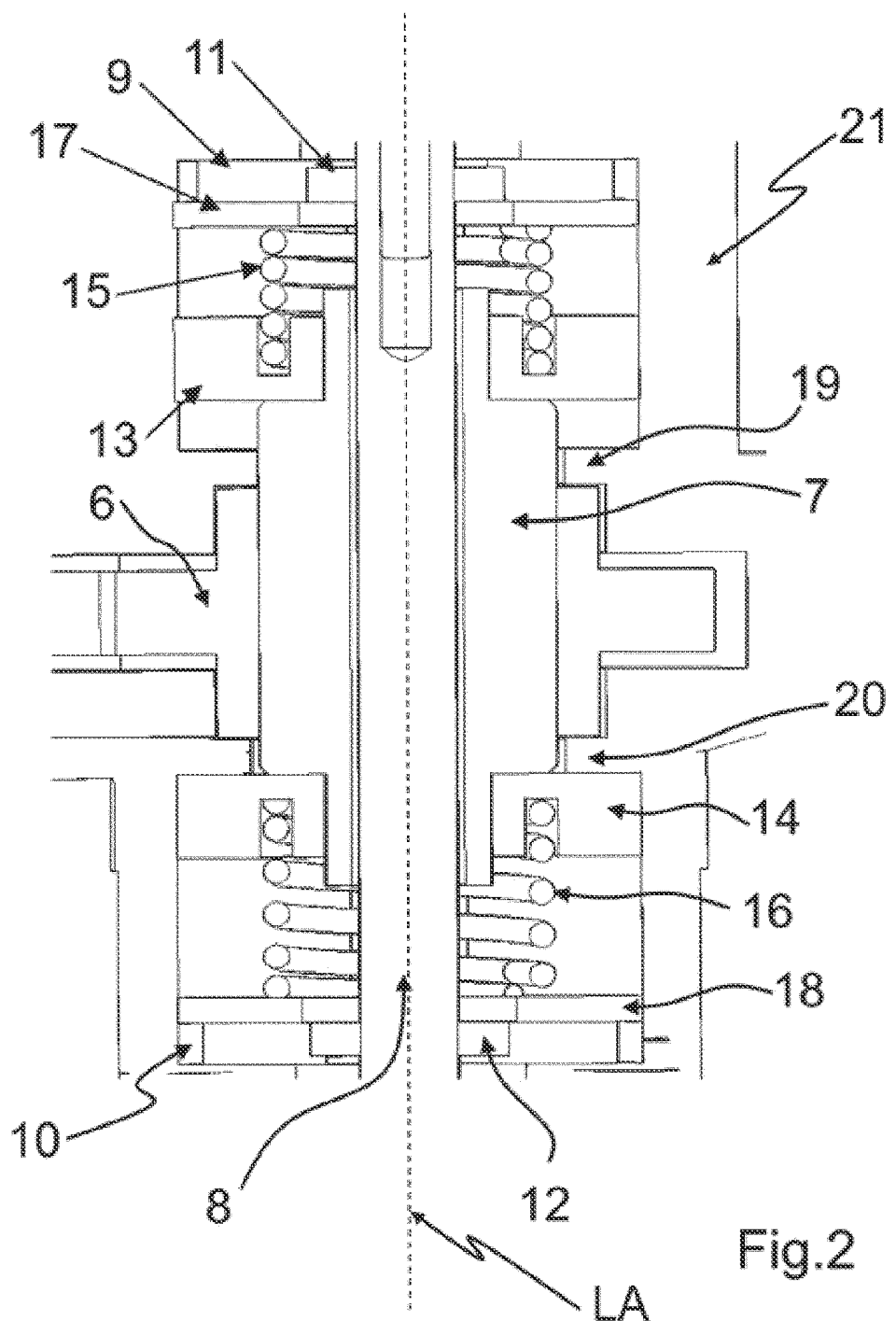
FIG. 2 is a detailed view of a brake device of the drive system according to the embodiment of FIG. 1.

FIG. 2 is a detailed view of a part of the brake device 2 of the drive system 1 of FIG. 1. The brake device 2 for example comprises, in each case, a brake disc 9 and counter brake disc 10 attached to the shaft 8. In an embodiment, the brake disc 9 and counter brake disc 10 are connected to the shaft by a free wheel 11 and a counter free wheel 12 having a mutually opposing freewheeling direction. As a result, depending on the direction of rotation of the shaft 8 about the longitudinal axis LA thereof, at all times only either the brake disc 9 or the counter brake disc 10 rotates together with the shaft 8, by the free wheel 11 or counter free wheel 12 thereof.

The connection device 7 which can be displaced along the longitudinal axis LA by the braking torque adjustment drive can for example displace a spring support 13 and a counter spring support 14 along the longitudinal axis LA such that the tension(s) of a spring 15 arranged between the connection device and a thrust washer 17, and/or of a counter spring 16 arranged between the connection device 7 and a counter thrust washer 18, can be set.

The setting of the tension(s) makes it possible to vary the contact pressure, required for generating the braking torque and/or counter braking torque, of the thrust washer 17 and/or counter thrust washer 18, arranged in a housing 21 of the brake device 2 in a manner inhibited in rotation, on the associated brake disc 9 and/or counter brake disc 10. A variable braking torque and counter braking torque on the shaft 8 thus results.

A stop 19 and/or a counter stop 20 can in each case limit the maximum spacing of the spring supports 13 from the thrust washer 17 and/or of the counter spring support 14 from the counter thrust washer 18, such that a minimum braking torque and/or counter braking torque can be predefined, which torque cannot be fallen below, even if the connection device 7 moves further from the thrust washer 17 or counter thrust washer 18 (and possibly no longer rests against the spring support 13 or counter spring support 14). The stop 19 and/or counter stop 20 are for example part of the housing 21, but other embodiments are also conceivable.

Figure 3:
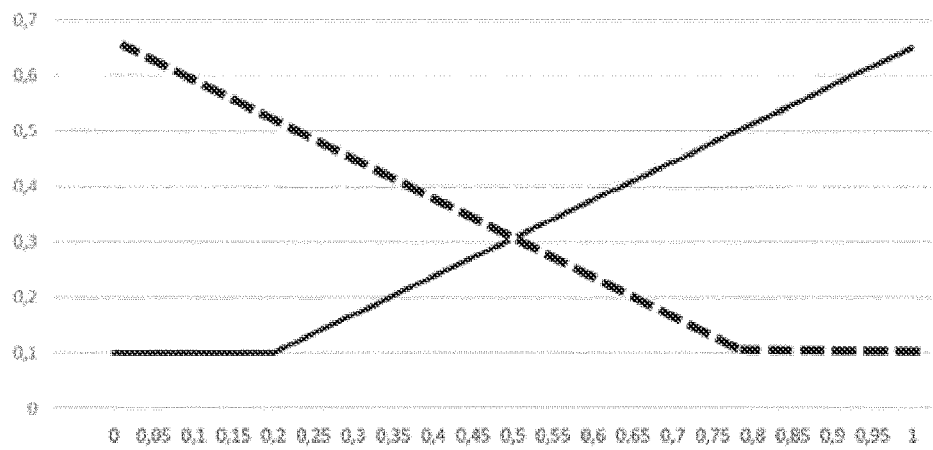
FIG. 3 shows a possible progression of the braking torque and of the counter braking torque in a brake device according to an embodiment.

FIG. 3 shows a possible progression of the braking torque (solid line) and of the counter braking torque (dashed line) for the two movement directions of the shaft 8, in an embodiment of a brake device 2 according to embodiments of the invention. Here and in FIG. 4, in each case the braking torque and the counter braking torque (y-axis), for example in Nm, are plotted against a position (x-axis) of the connection device 7 relative to a displacement path of the connection device 7 along the longitudinal axis LA. In this case, 0 and 1, respectively, each mean a maximum displacement of the connection device 7 in one of the two directions (in FIG. 1 or 2, all the way upwards or all the way downwards). A displacement of 0.5 represents a central position of the connection device 7, in each case.

In this embodiment of FIG. 3, in each case a minimum braking torque and counter braking torque (of magnitude 0.1 Nm) is predefined, for example by a stop 19 and a counter stop 20. In a central position, for example the braking torque and counter braking torque are equally great.

Figure 4:
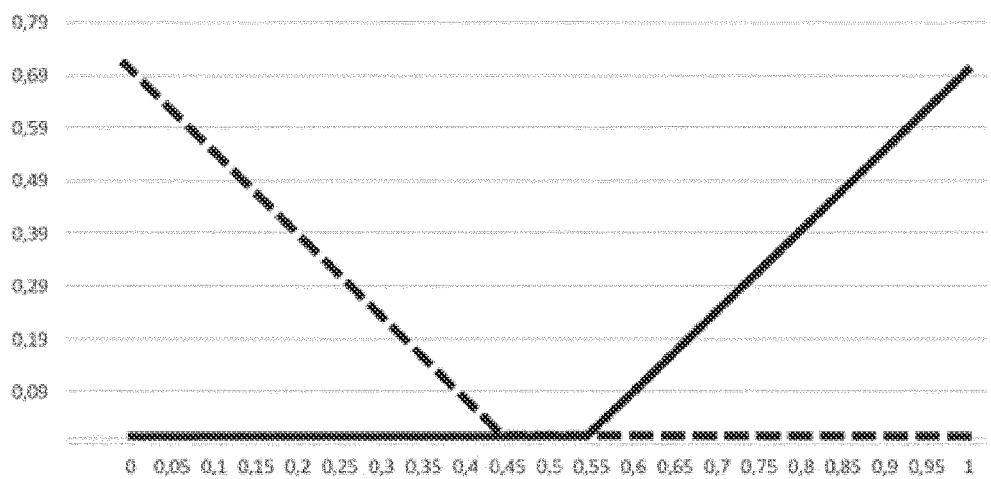
FIG. 4 shows another possible progression of the braking torque and of the counter braking torque in a brake device according to another embodiment.

FIG. 4 shows another possible progression of the braking torque and of the counter braking torque in an embodiment of a brake device 2 according to embodiments of the invention. In this case, the brake device 2 is designed such that the braking torque or the counter braking torque is zero for one region of the displacement path, in each case, wherein the braking torque and the counter braking torque can be zero for example around the central position of the connection device 7.

This can be achieved for example, in comparison to FIG. 3, in that a length of the connection device 7 along the longitudinal axis LA is reduced, such that the connection device 7 rests either on the spring support 13 or on the counter spring support 14 in one portion, in each case, of the displacement path, and in the central position rests neither on the spring support 13 nor on the counter spring support 14. In this embodiment no stop 19 or counter stop 20 is provided, or the stop 19 and the counter stop 20 are so far from the thrust washer 17 and the counter thrust washer 18 that they do not bring about any braking effect for a minimum braking torque or counter braking torque.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| List of reference characters | |
|---|---|
| LA | longitudinal axis |
| 1 | drive system |
| 2 | brake device |
| 3 | braking torque adjustment drive |
| 4 | adjustment shaft |
| 5 | drive spur gear |
| 6 | main spur gear |
| 7 | connection device |
| 8 | shaft |
| 9 | brake disc |
| 10 | counter brake disc |
| 11 | free wheel |
| 12 | counter free wheel |
| 13 | spring support |
| 14 | counter spring support |
| 15 | spring |
| 16 | counter spring |
| 17 | thrust washer |
| 18 | counter thrust washer |
| 19 | stop |
| 20 | counter stop |
| 21 | housing |

The invention claimed is:

1. A brake device for braking a rotational movement of a shaft about a longitudinal axis, wherein the shaft is mounted so as to be rotatable about the longitudinal axis in a direction of rotation and in a counter direction of rotation which opposes the direction of rotation, a) at least one brake disc which is connected to the shaft by free wheel and which is configured to cooperate with a thrust washer in order to generate a braking torque on the shaft, wherein the free wheel couples the brake disc to the shaft in the event of a rotation of the shaft in the direction of rotation, and decouples it from the shaft in the event of a rotation of the shaft in the counter direction of rotation; and b) at least one counter brake disc which is connected to the shaft by a counter free wheel and which is configured to cooperate with a counter thrust washer order to generate a counter braking torque on the shaft, wherein the counter free wheel couples the counter brake disc to the shaft in the event of a rotation of the shaft in the counter direction of rotation, and decouples it from the shaft in the event of a rotation of the shaft in the direction of rotation; and c) at least one setting device for setting the braking torque and the counter braking torque in a mutually opposing manner.

2. The brake device according to claim 1, wherein the setting device comprises a connection device, wherein the connection device mechanically connects the thrust washer to the counter thrust washer and is arranged so as to be displaceable along a connection axis, between the brake disc and the counter brake disc over a displacement path.

3. The brake device according to claim 2, wherein the connection device is arranged between the thrust washer and the counter thrust washer, and wherein
a) a spring for pressing the thrust washer onto the brake disc is arranged between the connection device and the thrust washer; and/or
a) a counter spring for pressing the counter thrust washer onto the counter brake disc is arranged between the connection device and the counter thrust washer.

4. The brake device according to claim 2, wherein the thrust washer, the counter thrust washer, the brake disc and the counter brake disc are arranged annularly around the longitudinal axis, and the connection device is arranged in a sleeve-like manner around the longitudinal axis and is mounted so as to be displaceable along the longitudinal axis, wherein the thrust washer and the counter thrust washer are arranged between the brake disc and the counter brake disc, and the connection device is arranged between the thrust washer and the counter thrust washer.

5. The brake device according to claim 2, characterised by a braking torque adjustment drive displacing the connection device along the connection axis, wherein the braking torque adjustment drive is mechanically connected to the connection device by a self-locking gear.

6. The brake device according to claim 2, wherein the case of a displacement of the connection device in a region of the displacement path:
only setting either of the braking torque or of the counter braking torque is brought about, while the respective other torque remains constant,
and/or
the braking torque is increased and the counter braking torque is simultaneously reduced, or vice versa, and/or
neither the braking torque nor the counter braking torque is changed.

7. The brake device according to claim 1, further comprising:
a) a stop for the thrust washer, wherein the stop brings about cooperation of the thrust washer with the brake disc for generating a minimum braking torque independently of a setting of the setting device; and/or
b) a counter stop for the counter thrust washer, wherein the counter stop brings about cooperation of the counter thrust washer with the counter brake disc for generating a minimum counter braking torque independently of a setting of the setting device.

8. The brake device according to claim 1, further comprising:
a) a control unit for automatic setting of the braking torque and/or of the counter braking torque; and
b) a number of sensors which are connected communicatively to the control unit, for determining a load torque acting on the shaft in the direction of rotation or counter direction of rotation.

9. A drive system for driving a rotational movement of a shaft about a longitudinal axis, in a direction of rotation and/or in a counter direction of rotation opposite the direction of rotation, wherein the drive system comprises at least one brake device according to claim 1 for braking a rotational movement of the shaft in the direction of rotation and in the counter direction of rotation.

10. A device, in particular vehicle or item of furniture, comprising a reference portion and a movement portion, comprising:
a) at least one drive system according to claim 9, for driving a movement of the movement portion relative to the reference portion; and
b) a control unit for setting the braking torque brought about by the brake device of the drive system; and
c) a number of sensors which are connected communicatively to the control unit, for determining a load torque acting on the shaft in the direction of rotation or counter direction of rotation of the shaft of the drive system.

11. The device according to claim 10, wherein the sensors comprise at least one position sensor for determining a position of the movement portion in a gravitational field.

12. A method for setting the braking torque and/or counter braking torque brought about by the brake device of the drive device of a device according to claim 10, using the control unit of the device, comprising:
a) determining, by the sensors of the device, a load torque acting on the shaft in the direction of rotation or counter direction of rotation of the shaft of the drive system; and
b) setting the braking torque and/or counter braking torque brought about by the brake device, such that the load torque is balanced by the braking torque or the counter braking torque of the brake device that counteracts the load torque, wherein the braking torque and the counter braking torque are set in a mutually opposing manner.

* * * * *